US011539938B2

(12) United States Patent
Ko

(10) Patent No.: US 11,539,938 B2
(45) Date of Patent: Dec. 27, 2022

(54) FLOATING IMAGE-TYPE CONTROL DEVICE, INTERACTIVE DISPLAY SYSTEM, AND FLOATING CONTROL METHOD

(71) Applicant: Acer Incorporated, New Taipei (TW)

(72) Inventor: Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 258 days.

(21) Appl. No.: 17/077,665

(22) Filed: Oct. 22, 2020

(65) Prior Publication Data
US 2021/0203916 A1 Jul. 1, 2021

(30) Foreign Application Priority Data
Dec. 31, 2019 (TW) ................................ 108148593

(51) Int. Cl.
*H04N 13/393* (2018.01)
*G02B 30/56* (2020.01)
(Continued)

(52) U.S. Cl.
CPC ....... *H04N 13/393* (2018.05); *G02B 27/0103* (2013.01); *G02B 30/56* (2020.01);
(Continued)

(58) Field of Classification Search
None
See application file for complete search history.

(56) References Cited

U.S. PATENT DOCUMENTS 8,411,108 B2\* 4/2013 Gilbert ................... B60Q 1/326
345/619
10,192,472 B1\* 1/2019 Nocon .................... G09G 3/005
(Continued)

FOREIGN PATENT DOCUMENTS

CN 106506931 A \* 3/2017 ........... G06F 1/1686
CN 106556414 A \* 4/2017 ........... G01B 11/002
(Continued)

OTHER PUBLICATIONS

Office Action issued in Taiwanese Patent Application No. 108148593, dated Aug. 13, 2020.

*Primary Examiner* — Mohammed Jebari
(74) *Attorney, Agent, or Firm* — Birch, Stewart, Kolasch & Birch, LLP

(57) ABSTRACT

A floating image-type control device, an interactive display system and a floating control method are provided. The floating image-type control device includes a rotation component and a control component. The rotation component includes a fixing portion, a bearing body and a rotation shaft. The rotation shaft is connected to the bearing body. The rotation shaft rotates relative to the fixing portion to drive the bearing body to rotate. The control component includes an image capturing unit, a zero-point calibration unit and an image analysis unit. The image capturing unit is disposed on the bearing body. The image capturing unit rotates with the bearing body and continuously captures several images. The zero-point calibration unit is used to send a zero-point signal when the bearing body rotates to a predetermined angle. The image analysis unit is used to obtain an operation signal based on the images and the zero-point signal.

16 Claims, 13 Drawing Sheets

(51) Int. Cl.
  *G06F 3/01*   (2006.01)
  *G02B 27/01*  (2006.01)
  *G02B 30/54*     (2020.01)
  *G06F 3/03*      (2006.01)

(52) U.S. Cl.
  CPC .............. *G06F 3/017* (2013.01); *G02B 30/54* (2020.01); *G02B 2027/0138* (2013.01); *G06F 3/0304* (2013.01)

(56) References Cited

U.S. PATENT DOCUMENTS

| | | | | |
|---|---|---|---|---|
| 2005/0035962 | A1* | 2/2005 | Ishibashi | G09G 3/003 |
| | | | | 345/110 |
| 2010/0171681 | A1* | 7/2010 | Cabanas | G09G 3/005 |
| | | | | 345/31 |
| 2017/0124925 | A1* | 5/2017 | Chykeyuk | G09G 3/001 |
| 2017/0220127 | A1* | 8/2017 | Musgrave | G06F 1/1686 |
| 2017/0223344 | A1* | 8/2017 | Kaehler | H04N 13/32 |
| 2017/0345218 | A1* | 11/2017 | Bedikian | G06F 1/1626 |
| 2019/0243153 | A1* | 8/2019 | Haseltine | G09G 3/36 |

FOREIGN PATENT DOCUMENTS

| | | | | |
|---|---|---|---|---|
| CN | 106686429 | A * | 5/2017 | ....... H04N 21/42201 |
| CN | 107134241 | A | 9/2017 | |
| CN | 109035888 | A | 12/2018 | |
| CN | 109087593 | A | 12/2018 | |
| CN | 109859663 | A | 6/2019 | |
| CN | 109903710 | A | 6/2019 | |
| TW | M583818 | U | 9/2019 | |
| WO | WO 2019/023489 | A1 | 1/2019 | |

\* cited by examiner

FLOATING IMAGE-TYPE CONTROL DEVICE, INTERACTIVE DISPLAY SYSTEM, AND FLOATING CONTROL METHOD

This application claims the benefit of Taiwan application Serial No. 108148593, filed Dec. 31, 2019, the subject matter of which is incorporated herein by reference.

BACKGROUND OF THE INVENTION

Field of the Invention

The invention relates in general to a control device, display system and the control method, and more particularly to a floating image-type control device, an interactive display system and a floating control method.

Description of the Related Art

Along with the advance in the display technology, holographic display dispensing with the use of glasses has long been a dream product to many people. The goal is to provide a display which does not occupy space or occupies the least amount of space. The aerial display and the floating display are relevant technologies of holographic display.

The aerial display includes reflective type, refractive type, volumetric type, and curtain type. The volumetric type display produces visual residues through high speed. Both the reflective type display and the refractive type display form images through the use of optical path which allows the projection contents to be displayed on a second plane of the space. The curtain type display scatters the projection contents to the viewers' eyes through the disturbed particles in the air, the water, or the mist.

Currently, the above displays can be operated through an auxiliary tool such as mouse, keyboard, or joystick. However, the operation through an auxiliary tool still cannot provide the user with intuitive sensations. Therefore, it has become a prominent task for the industries to provide a floating control technology dispensing with the use of auxiliary control tool.

SUMMARY OF THE INVENTION

The invention is directed to a floating image-type control device, an interactive display system and a floating control method capable of completing a floating operation through the design of a rotation component and a control component. Furthermore, the rotation component and the control component can be combined with a display component to form an interactive display system, with allows the user to perform an intuitive operation.

According to a first aspect of the present invention, a floating image-type control device is provided. The floating image-type control device includes a rotation component and a control component. The rotation component includes a fixing portion, a bearing body and a rotation shaft. The rotation shaft is connected to the bearing body. The rotation shaft rotates relative to the fixing portion to drive the bearing body to rotate. The control component includes an image capturing unit, a zero-point calibration unit and an image analysis unit. The image capturing unit is disposed on the bearing body. The image capturing unit rotates with the bearing body and continuously captures several images. The zero-point calibration unit is used to send a zero-point signal when the bearing body rotates to a predetermined angle. The image analysis unit is used to obtain an operation signal based on the images and the zero-point signal.

According to a second aspect of the present invention, an interactive display system is provided. The interactive display system includes a rotation component, a control component and a display component. The rotation component includes a fixing portion, a bearing body and a rotation shaft. The rotation shaft is connected to the bearing body. The rotation shaft rotates relative to the fixing portion to drive the bearing body to rotate. The control component includes an image capturing unit, a zero-point calibration unit and an image analysis unit. The image capturing unit is disposed on the bearing body. The image capturing unit rotates with the bearing body and continuously captures several images. The zero-point calibration unit is used to send a zero-point signal when the bearing body rotates to a predetermined angle. The image analysis unit is used to obtain an operation signal based on the images and the zero-point signal. The display component is connected to the bearing body and rotates with the bearing body.

According to a third aspect of the present invention, a floating control method is provided. The floating control method includes the following steps. An image capturing unit is rotated. Several images are continuously captured by the image capturing unit. A zero-point signal is received. An operation signal is obtained based on the images and the zero-point signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
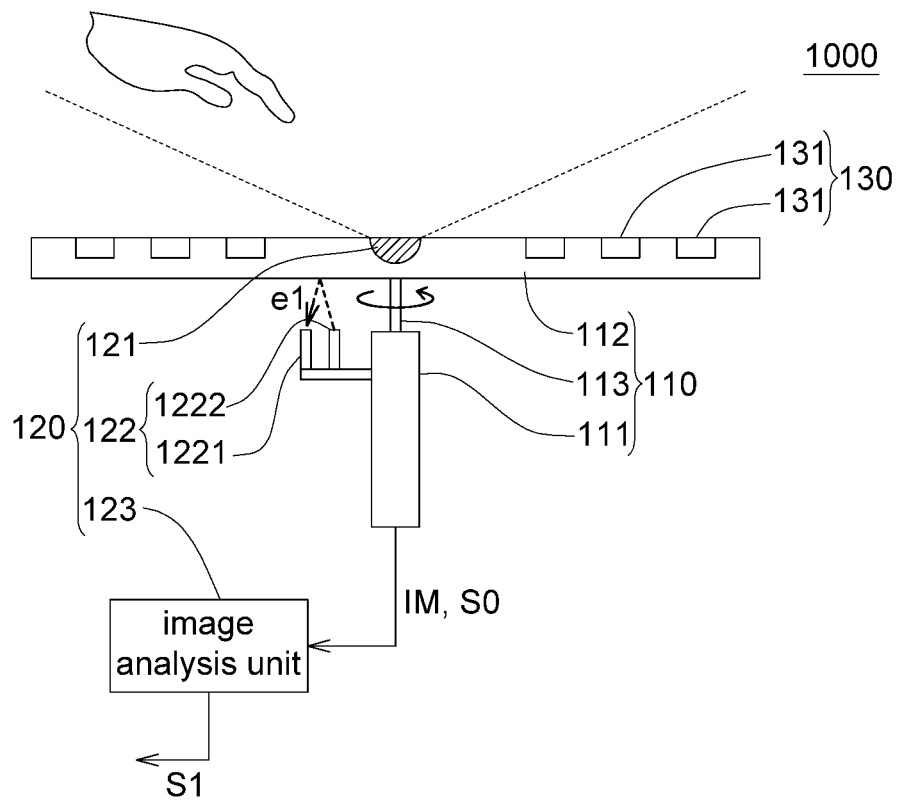
FIG. 1A is a schematic diagram of an interactive display system according to an embodiment.
Figure 1B:
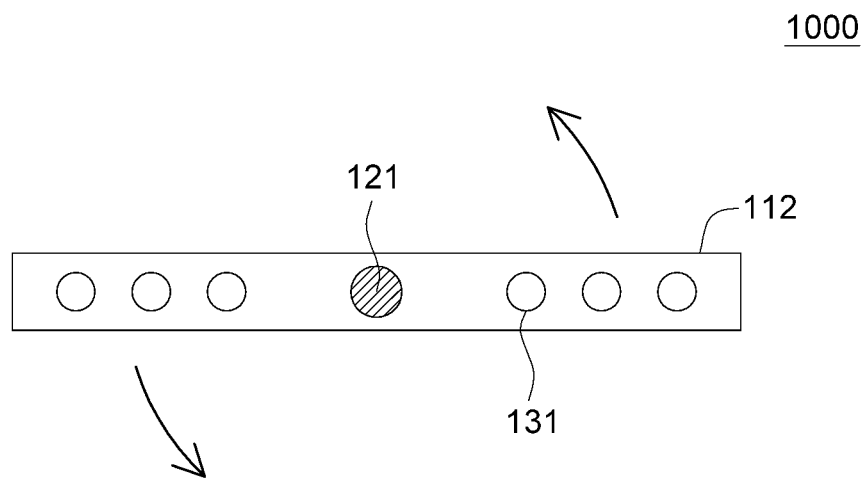
FIG. 1B is a top view of the interactive display system of FIG. 1A.

Refer to FIGS. 1A to 1B. FIG. 1A is a schematic diagram of an interactive display system 1000 according to an embodiment. FIG. 1B is a top view of the interactive display system 1000 of FIG. 1A. The interactive display system 1000 includes a rotation component 110, a control component 120 and a display component 130. The rotation component 110 includes a fixing portion 111, a bearing body 112 and a rotation shaft 113. The fixing portion 111, such as a fixing sleeve, does not move. The bearing body 112 can be realized by such as a plate structure, an arced structure, an annular structure, a semi-circular structure or a columnar structure. As indicated in FIG. 1A, the bearing body 112 is a plate structure. The rotation shaft 113 is connected to the bearing body 112 and rotates relative to the fixing portion 111 to drive the bearing body 112 to rotate.

The control component 120 includes an image capturing unit 121, a zero-point calibration unit 122 and an image analysis unit 123. The image capturing unit 121 and the image analysis unit 123 can be realized by such as a circuit, a chip, a circuit board, array code or storage device for storing code. The image capturing unit 121 is disposed on the bearing body 112. The image capturing unit 121 rotates with the bearing body 112 and continuously captures several images IM. As indicated in FIG. 1B, the image capturing unit 121 is disposed on a rotation center of the bearing body 112 and rotates with the bearing body 112.

The zero-point calibration unit 122 is used to emit a zero-point signal S0 when the bearing body 112 rotates to a predetermined angle. That is, the zero-point calibration unit 122 can send the zero-point signal S0 every time when the bearing body 112 rotates a circle and reaches the predetermined angle. The zero-point signal S0 can be used as a mark which helps the image analysis unit 123 to identify the corresponding angle of each image IM. When the user waves his/her palm or finger(s) in front of the image capturing unit 121, the image analysis unit 123 can analyze the gesture from the continuously captured images IM.

Thus, the image analysis unit 123 can obtain an operation signal S1 corresponding to the gesture based on the images IM and the zero-point signal S0.

The display component 130 can be formed of a number of light-emitting diodes 131. The display component 130 is connected to the bearing body 112. The light-emitting diodes 131 of the display component 130 rotate with the bearing body 112. When the bearing body 112 rotates at a high speed, the user will see the light-emitting diodes 131 filling the rotation range of the bearing body 112 due to visual persistence.

Through the interactive display system 1000 of FIG. 1A, the user can perform an intuitive operation from the top of the interactive display system 1000 to a frame displayed by the display component 130. During the intuitive operation, the user does not need to touch the bearing body 112 or the display component 130. Instead, the user only needs to wave his/her palm or finger(s) in the air.

In another embodiment, the rotation component 110 and the control component 120 can be combined to form a floating image-type control device. That is, in the absence of the display component 130, a floating image-cut operation still can be performed by the rotation component 110 and the control component 120 and the floating image-cut operation still is applicable to situations such as making a presentation or operating an elevator panel.

Figure 2:
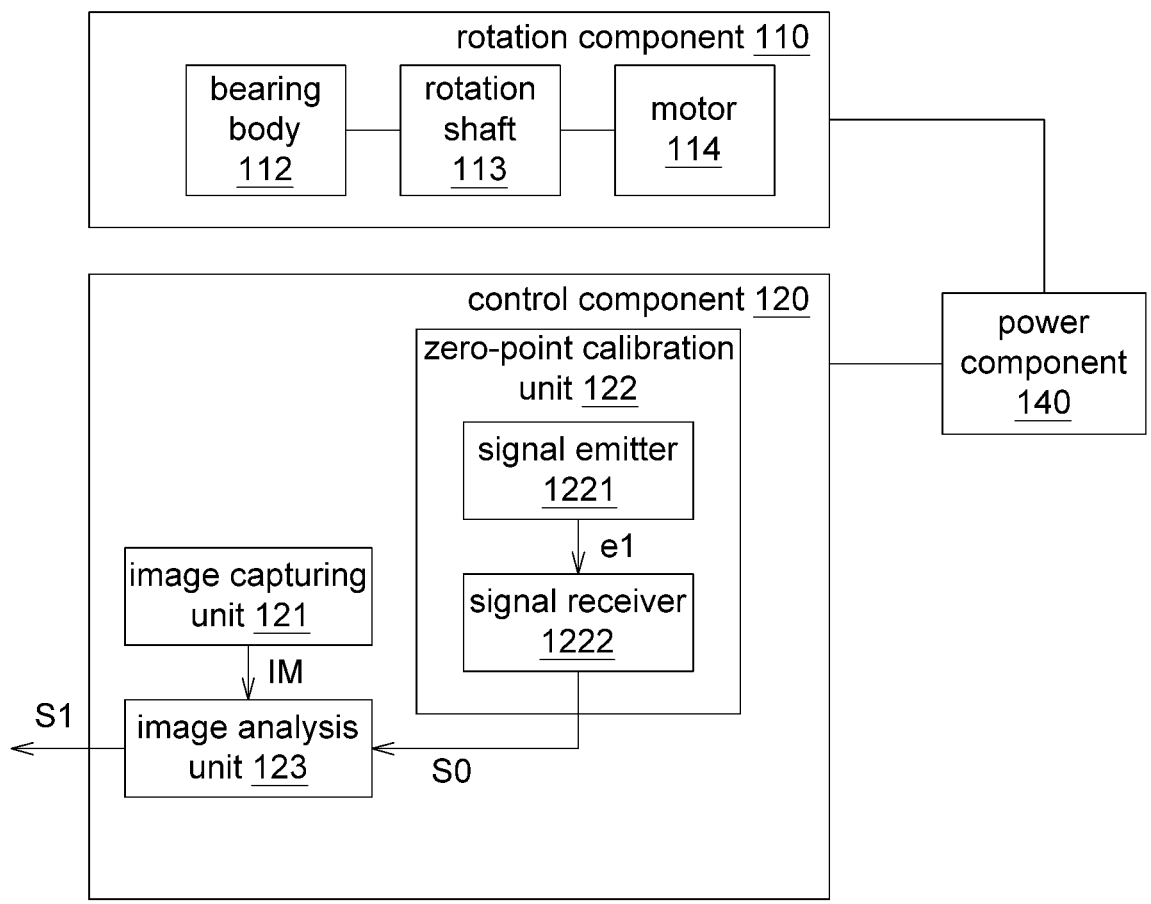
FIG. 2 is a block diagram of a floating image-type control device according to an embodiment.

Referring to FIG. 2, a block diagram of a floating image-type control device 100 according to an embodiment is shown. The floating image-type control device 100 includes a rotation component 110, a control component 120 and a power component 140. The power component 140 powers the motor 114 to drive the rotation shaft 113 to rotate. The rotation frequency of the motor 114 may be different from the capturing frequency of the image capturing unit 121. For example, the motor 114 starts with a lower rotation speed, which will stabilize after a period of time. The image capturing unit 121 can capture images at a stable capturing frequency. The zero-point signal S0 provided by the zero-point calibration unit 122 allows the image analysis unit 123 to identify the corresponding angle of each image IM. The zero-point calibration unit 122 includes a signal emitter 1221 and a signal receiver 1222. As indicated in FIG. 1A, the signal emitter 1221 is illustratively disposed on the fixing portion 111 (or the bearing body 112). The signal emitter 1221 is used to emit a sensing signal e1. The signal receiver 1222 is illustratively disposed on the fixing portion 111 (or the bearing body 112). A reflective material can be attached to the underneath of the bearing body 112. When the bearing body 112 rotates to the predetermined angle, the signal receiver 1222 receives the sensing signal e1 reflected from the bearing body 112 and further outputs the zero-point signal S0 based on the received sensing signal e1.

Figure 3:
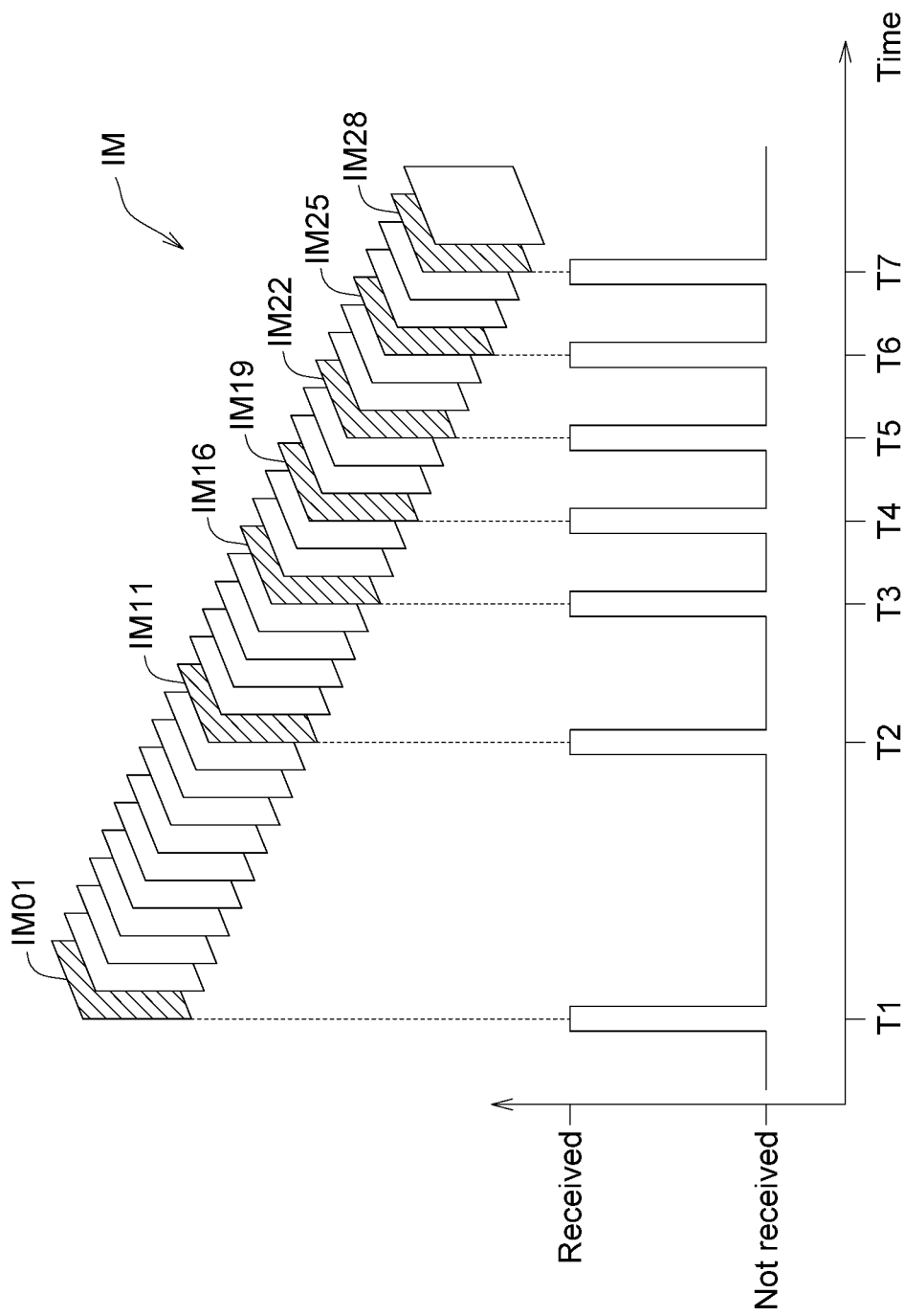
FIG. 3 is a relation diagram of zero-point signal vs images.

Referring to FIG. 3, a relation diagram of zero-point signal S0 vs images IM is shown. The signal receiver 1222 receives the sensing signal e1 at time points T1 to T7, . . . respectively. When the motor 114 just starts, the rotation speed is at a lower level. After the signal receiver 1222 receives the sensing signal e1 at time point T1, the signal receiver 1222 does not receive the sensing signal e1 until time point T2. Each time the bearing body 112 receives the sensing signal e1, this implies that the bearing body 112 already rotates for a circle. When the rotation speed of the motor 114 stabilizes, the time interval at which the signal receiver 1222 receives the sensing signal e1 at time points T4 to T7, . . . reduces. Each time the bearing body 112 receives the sensing signal e1, this implies that the bearing body 112 already rotates for a circle. It can be understood from the relation diagram of FIG. 3 that images IM01, IM11, IM16, IM19, IM22, IM25, IM28, . . . respectively correspond to time points T1 to T7, . . . . Based on such correspondence relation, the corresponding angle of each image IM can be calculated.

Even when the user accidentally touches the bearing body 112 and changes the rotation speed of the bearing body 112, the zero-point signal S0 is still emitted at the predetermined angle, therefore each image IM still corresponds to the correct angle. Thus, the user's floating gesture can be precisely identified. Here below, the operations of each component are described with an accompanying flowchart.

Figure 4:
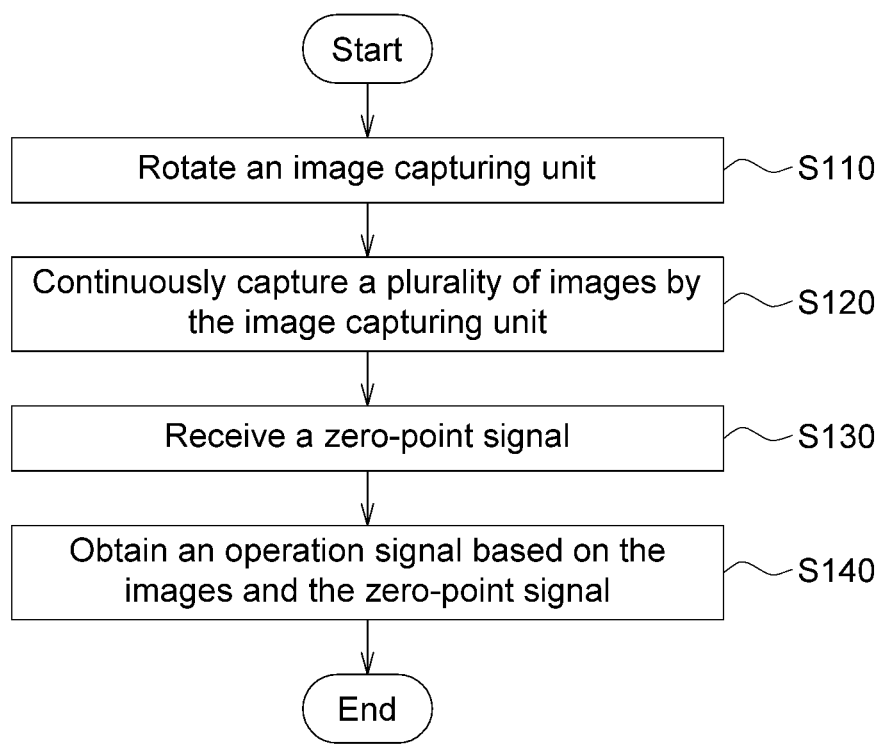
FIG. 4 is a flowchart of a floating control method according to an embodiment.

Referring to FIG. 4, a flowchart of a floating control method according to an embodiment is shown. In step S110, the rotation shaft 113 of the rotation component 110 is rotated to drive the bearing body 112 and the image capturing unit 121 to rotate. The image capturing unit 121 can rotate by itself or can rotate around a center axis.

Then, the method proceeds to step S120, several images IM are continuously captured by the image capturing unit 121. Since the image capturing unit 121 can capture images with fixed resolution, size and brightness, the required time for capturing each image IM is substantially identical.

After that, the method proceeds to step S130, a zero-point signal S0 is received by the zero-point calibration unit 122.

Then, the method proceeds to step S140, the operation signal S1 is obtained by the image analysis unit 123 based on the images IM and the zero-point signal S0. In the present step, the image analysis unit 123 calculates the corresponding angle of each image IM based on the zero-point signal S0. Then, based on the angle, the image analysis unit 123 can perform suitable treatments, such as rotation, clipping, stitching and selection, to facilitate the judgement of gesture. After the image analysis unit 123 analyzes the gesture, the operation signal S1 corresponding to the gesture can be obtained through a look-up table (such as turn a page over, slide on the page or rotate an object).

Figure 5A:
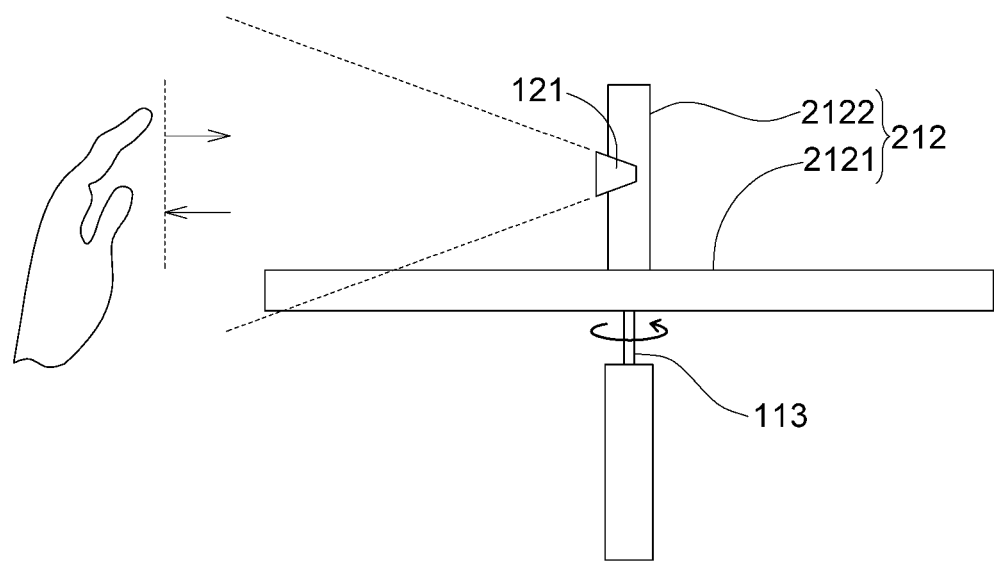
FIG. 5A is a schematic diagram of a bearing body and an image capturing unit according to an embodiment.
Figure 5B:
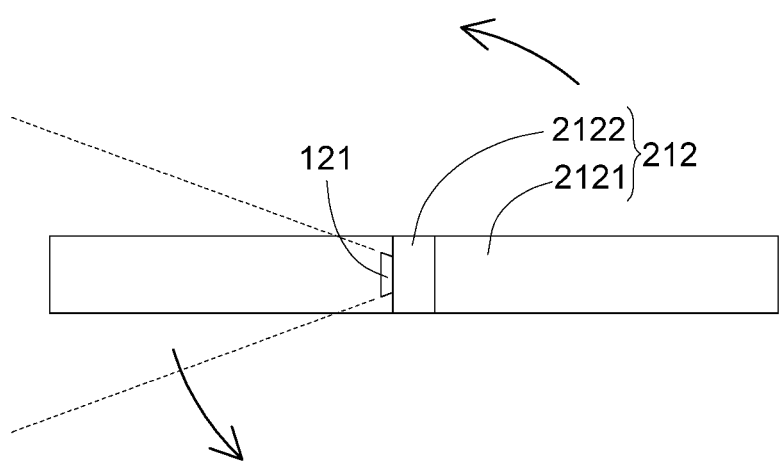
FIG. 5B is a top view of the bearing body and the image capturing unit of FIG. 5A.

Apart from the above implementations, the bearing body 112 and the image capturing unit 121 also can have other implementations. Refer to FIGS. 5A to 5B. FIG. 5A is a schematic diagram of a bearing body 212 and an image capturing unit according to an embodiment. FIG. 5B is a top view of the bearing body 212 and the image capturing unit 121 of FIG. 5A. The bearing body 212 includes a plate 2121 and a side panel 2122. The plate 2121 is connected to the rotation shaft 113. The side panel 2122 is connected to the plate 2121. The side panel 2122 is substantially perpendicular to the plate 2121. The image capturing unit 121 is disposed on the side panel 2122. In an embodiment as indicated in FIGS. 5A to 5B, the side panel 2122 is located on a rotation center of the plate 2121.

Figure 6A:
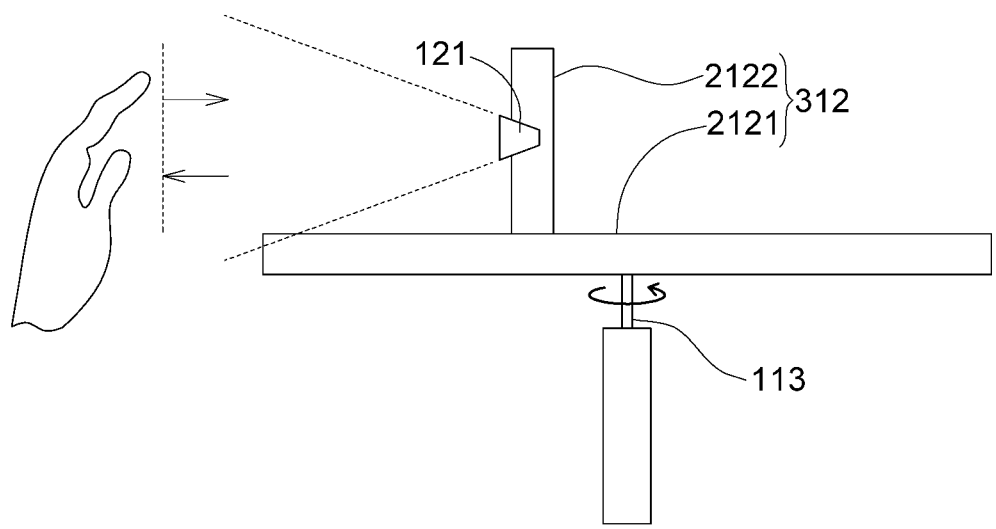
FIG. 6A is a schematic diagram of a bearing body and an image capturing unit according to an embodiment.
Figure 6B:
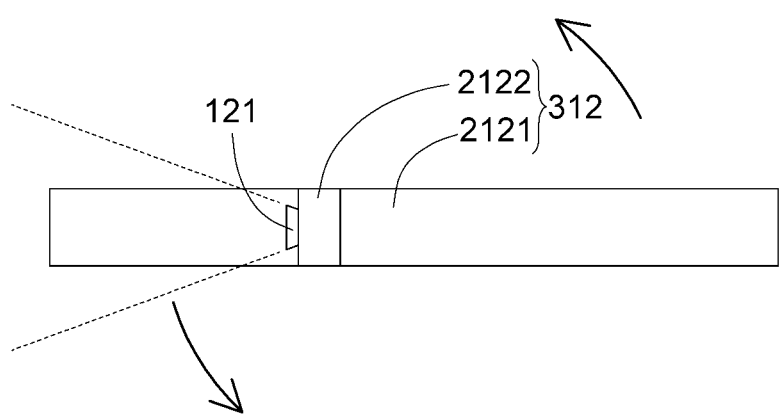
FIG. 6B is unit a top view of the bearing body and the image capturing of FIG. 6A.

Refer to FIGS. 6A to 6B. FIG. 6A is a schematic diagram of a bearing body 312 and an image capturing unit 121 according to an embodiment. FIG. 6B is unit a top view of the bearing body 312 and the image capturing of FIG. 6A. In an embodiment as indicated in FIGS. 6A to 6B, the side panel 2122 deviates from the rotation center of the plate 2121.

Figure 7A:
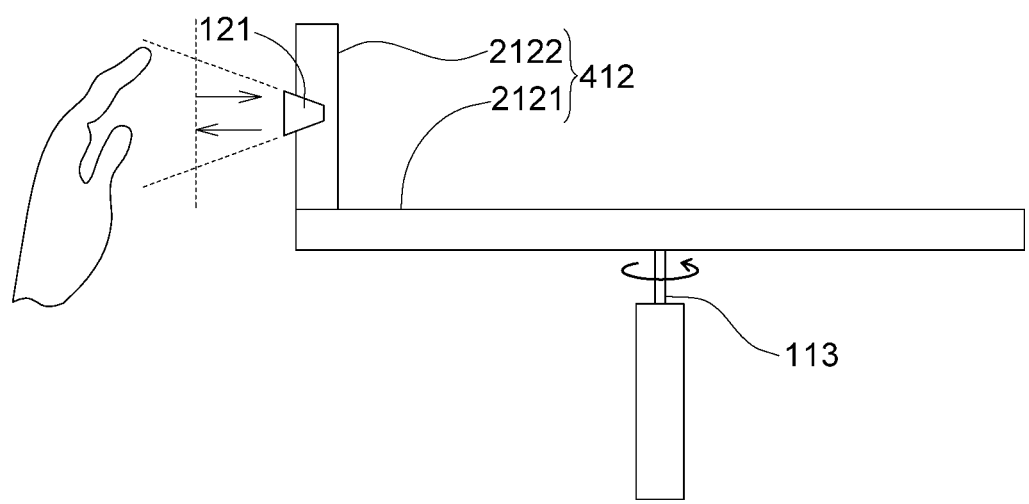
FIG. 7A is a schematic diagram of a bearing body and an image capturing unit according to an embodiment.
Figure 7B:
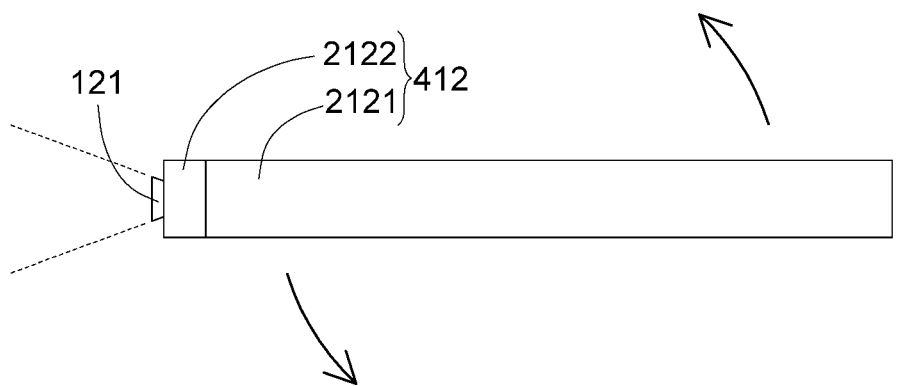
FIG. 7B is unit a top view of the bearing body and the image capturing of FIG. 7A.

Refer to FIGS. 7A to 7B. FIG. 7A is a schematic diagram of a bearing body 412 and an image capturing unit 121 according to an embodiment. FIG. 7B is unit a top view of the bearing body 412 and the image capturing of FIG. 7A. In an embodiment as indicated in FIGS. 7A to 7B, the side panel 2122 is located on a side of the plate 2121, and the image capturing unit 121 faces outwardly.

Figure 8A:
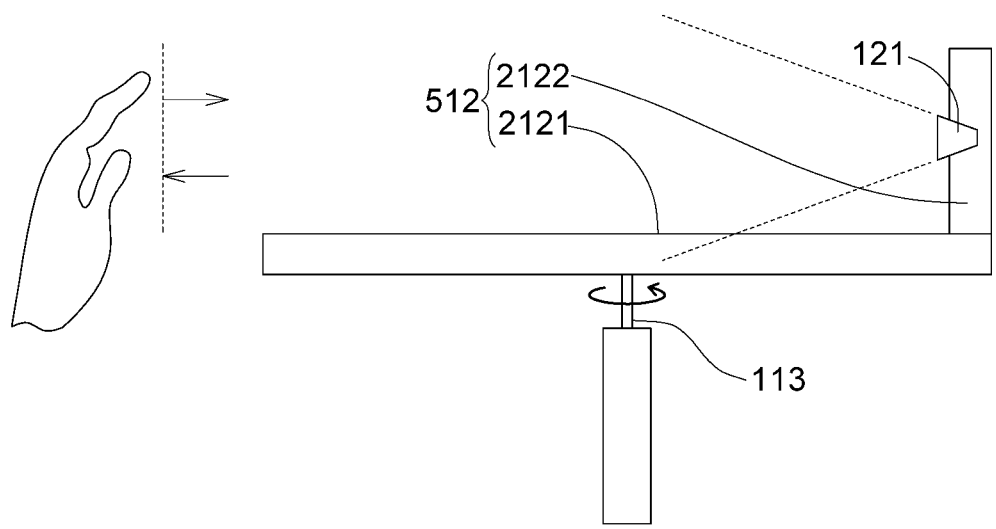
FIG. 8A is a schematic diagram of a bearing body and an image capturing unit according to an embodiment.
Figure 8B:
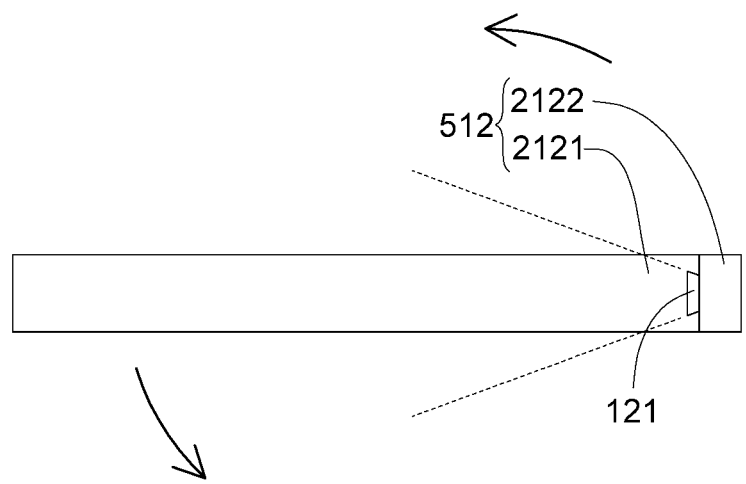
FIG. 8B is unit a top view of the bearing body and the image capturing of FIG. 8A.

Refer to FIGS. 8A to 8B. FIG. 8A is a schematic diagram of a bearing body 512 and an image capturing unit 121 according to an embodiment. FIG. 8B is unit a top view of the bearing body 512 and the image capturing of FIG. 8A. In an embodiment as indicated in FIGS. 8A to 8B, the side panel 2122 is located on a side of the plate 2121, and the image capturing unit 121 faces inwardly.

Figure 9A:
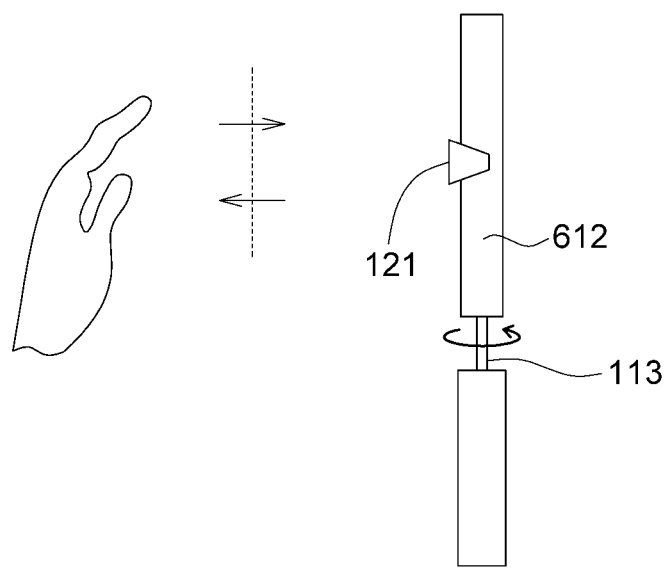
FIG. 9A is a schematic diagram of a bearing body and an image capturing unit according to an embodiment.
Figure 9B:
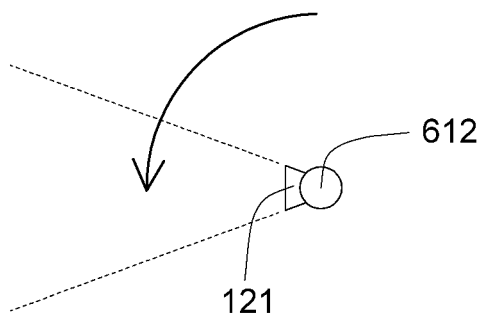
FIG. 9B is a top view of the bearing body and the image capturing unit of FIG. 9A.

Refer to FIGS. 9A to 9B. FIG. 9A is a schematic diagram of a bearing body 612 and an image capturing unit 121 according to an embodiment. FIG. 9B is a top view of the bearing body 612 and the image capturing unit 121 of FIG. 9A. In an embodiment as indicated in FIGS. 9A to 9B, the bearing body 612 is a columnar structure, and has an extension direction identical to that of the rotation shaft 113.

Figure 10:
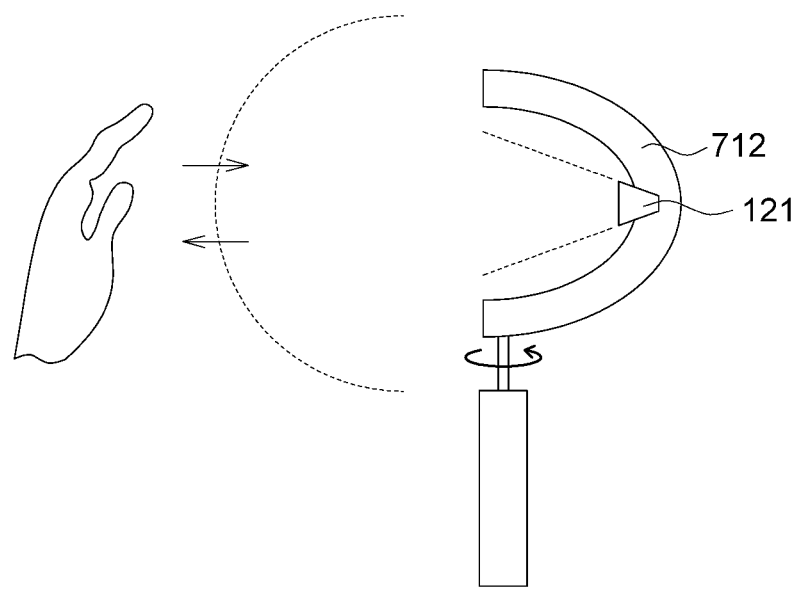
FIG. 10 is a schematic diagram of a bearing body and an image capturing unit according to an embodiment.

Referring to FIG. 10, a schematic diagram of a bearing body 712 and an image capturing unit 121 according to an embodiment. Is shown. In an embodiment as indicated in FIG. 10, the bearing body 712 is an arced structure, and the image capturing unit 121 is disposed inside the bearing body 712.

Figure 11:
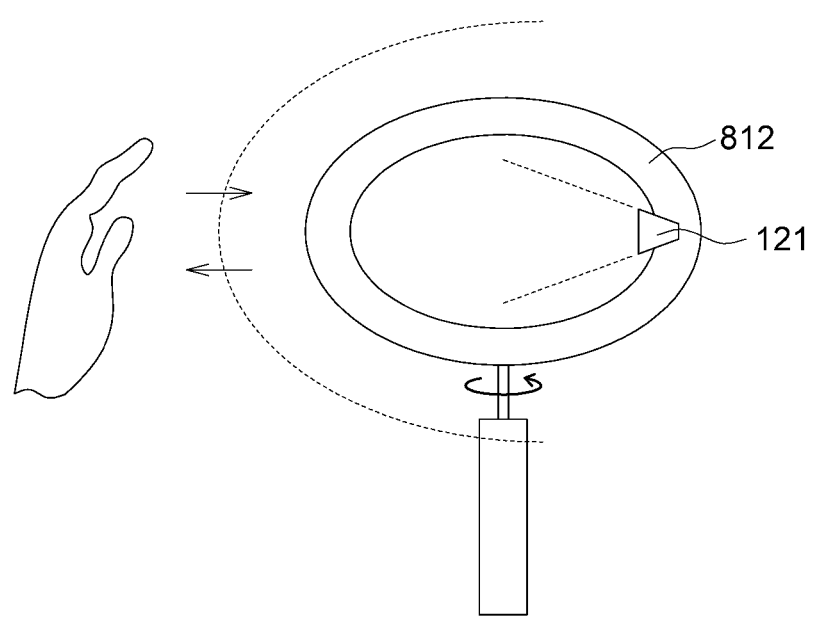
FIG. 11 is a schematic diagram of a bearing body and an image capturing unit according to an embodiment.

Referring to FIG. 11, a schematic diagram of a bearing body 812 and an image capturing unit 121 according to an embodiment is shown. In an embodiment as indicated in FIG. 11, the bearing body 812 is a ball structure, and the image capturing unit 121 is disposed inside the bearing body 812. In an embodiment as indicated in FIG. 11, shadows exist between the images IM captured by the image capturing unit 121. Nevertheless, when the image capturing unit 121 rotates at a high speed, all images IM still can be stitched to form a complete picture.

Figure 12:
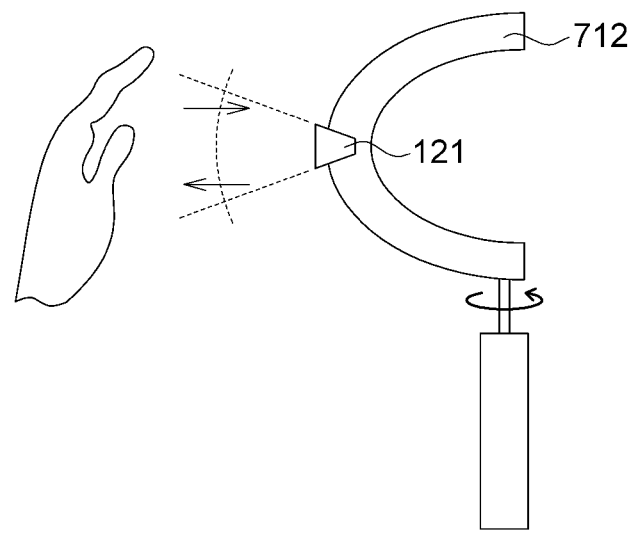
FIG. 12 is a schematic diagram of a bearing body and an image capturing unit according to an embodiment.

Referring to FIG. 12, a schematic diagram of a bearing body 712 and an image capturing unit 121 according to an embodiment is shown. In an embodiment as indicated in FIG. 12, the bearing body 712 is the arced structure, and the image capturing unit 121 is disposed outside the bearing body 712.

Figure 13:
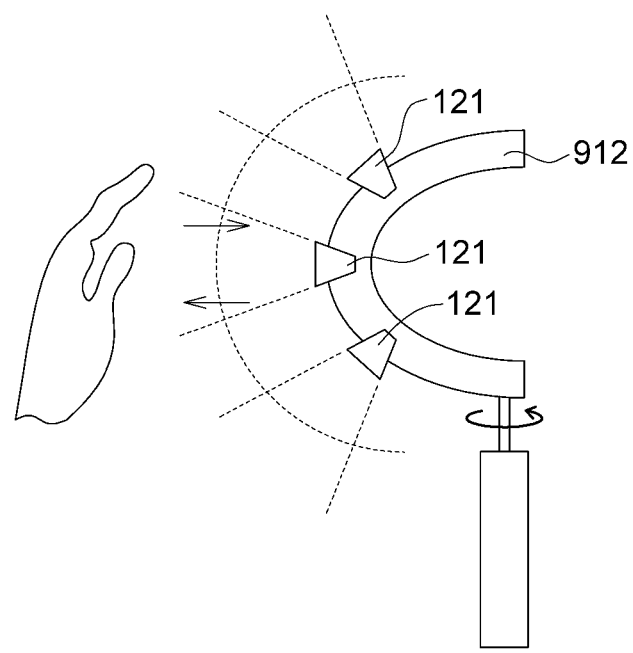
FIG. 13 is a schematic diagram of a bearing body and an image capturing unit according to an embodiment.

Referring to FIG. 13, a schematic diagram of a bearing body 712 and an image capturing unit 121 according to an embodiment is shown. In an embodiment as indicated in FIG. 13, the bearing body 712 is the arced structure, and three image capturing units 121 are disposed outside the bearing body 712.

Figure 14:
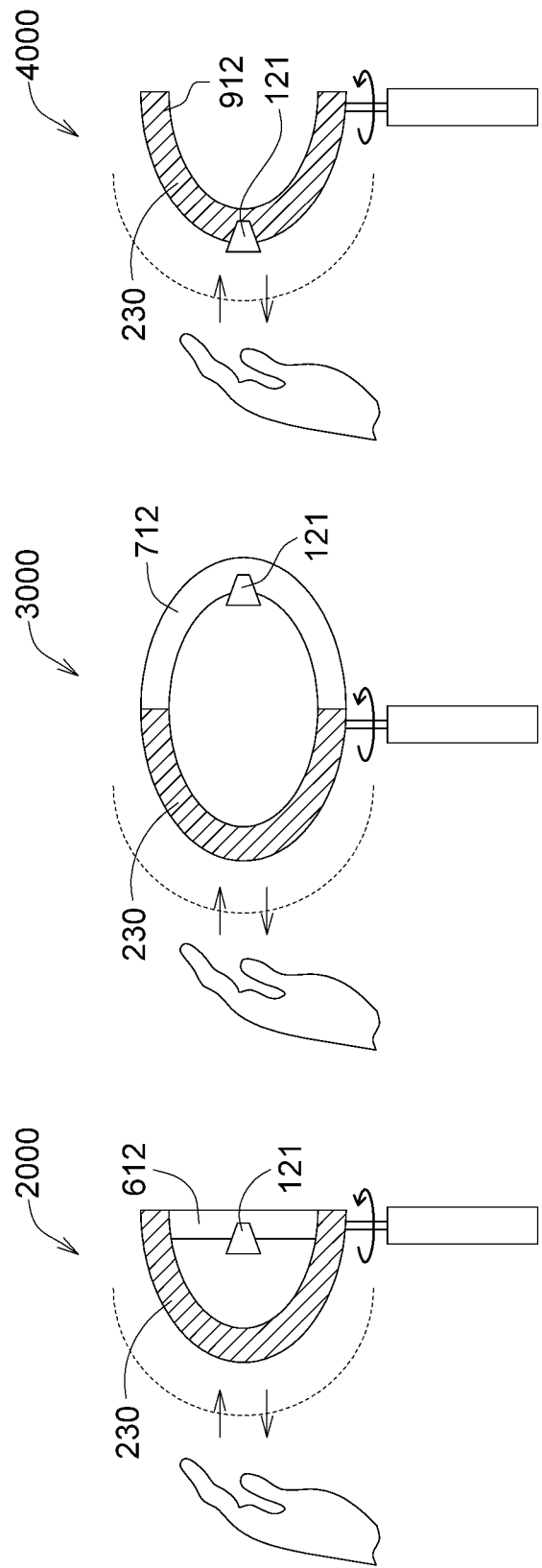
FIG. 14 is a schematic diagram of interactive display systems according to a number of embodiments.

Referring to FIG. 14, a schematic diagram of interactive display system 2000, 3000, and 4000 according to a number of embodiments is shown. The display component 230 can be realized by a flexible transparent display panel (marked by slash lines). The display component 230 is connected to the bearing body 612 (or the bearing body 712) to form an interactive display system 2000 (or an interactive display system 3000). The display component 230 is integrated in the bearing body 912 to form an interactive display system 4000.

Figure 15:
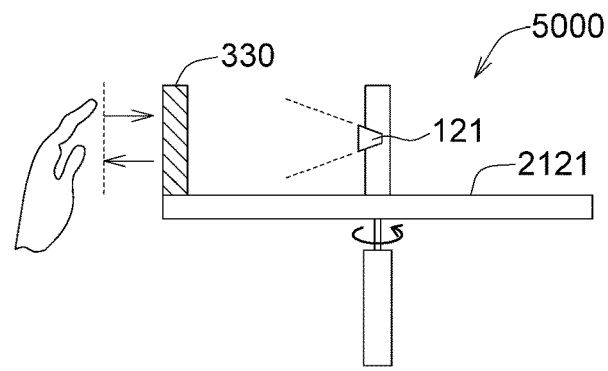
FIG. 15 is a schematic diagram of interactive display systems according to a number of embodiments.
Figure 15:
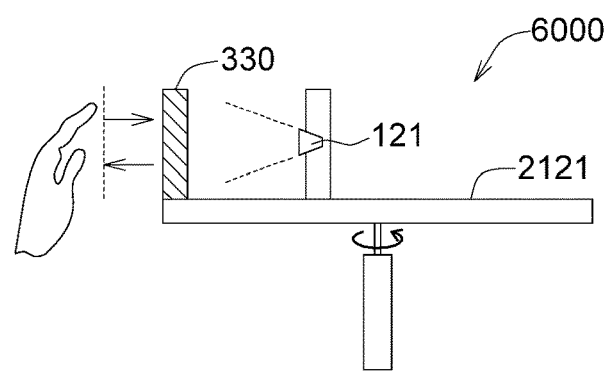
Figure 15:
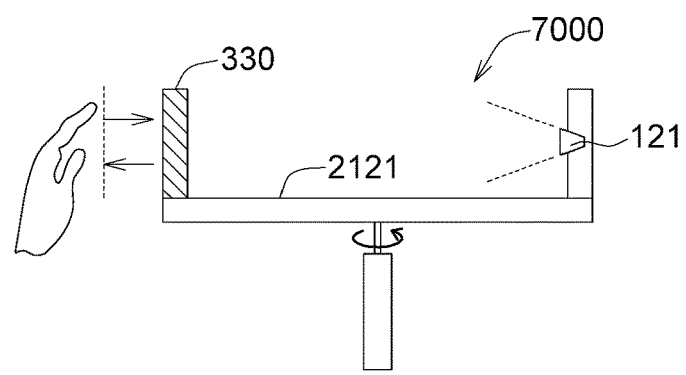
Figure 15:
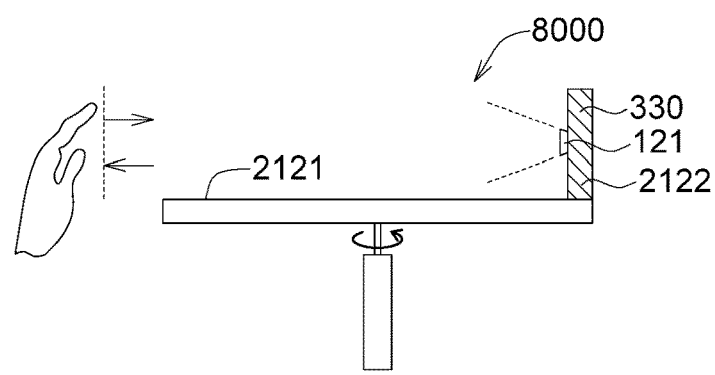

Referring to FIG. 15, a schematic diagram of interactive display systems 5000, 6000, 7000, and 8000 according to a number of embodiments is shown. The display component 330 can be realized by a hard transparent display panel (marked by slash lines). The display component 330 is located on a side of the plate 2121 to form an interactive display system 5000, 6000, or 7000. The display component 330 is integrated in the side panel 2122 to form an interactive display system 8000.

Through the above embodiments, the user can perform am intuitive operation to an interactive display system. During the intuitive operation, the user does not need to touch the bearing body 112 or the display component 130. Instead, the user only needs to wave his/her palm or finger(s) in the air. Besides, in the absence of the display component 130, a floating image-cut operation still can be performed by the rotation component and the control component.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A floating image-type control device, comprising:
a rotation component, comprising:
a fixing portion;
a bearing body; and a rotation shaft connected to the bearing body, wherein the rotation shaft rotates relative to the fixing portion to drive the bearing body to rotate; and a control component, comprising:
- an image capturing unit disposed on the bearing body, wherein the image capturing unit rotates with the bearing body and continuously captures a plurality of images;
- a zero-point calibration unit used to send a zero-point signal when the bearing body rotates to a predetermined angle; and
- an image analysis unit used to obtain an operation signal corresponding to a gesture of a user based on the images and the zero-point signal.

2. The floating image-type control device according to claim 1, wherein the zero-point calibration unit comprises:
- a signal emitter disposed on the fixing portion and used to emit a sensing signal; and
- a signal receiver disposed on the fixing portion, wherein when the bearing body rotates to the predetermined angle, the signal receiver receives the sensing signal reflected from the bearing body and further outputs the zero-point signal based on the received sensing signal.

3. The floating image-type control device according to claim 1, wherein the zero-point calibration unit comprises:
- a signal emitter disposed on the bearing body and used to emit a sensing signal; and
- a signal receiver disposed on the fixing portion, wherein when the bearing body rotates to the predetermined angle, the signal receiver receives the sensing signal and further outputs the zero-point signal based on the received sensing signal.

4. The floating image-type control device according to claim 1, wherein the image capturing unit is disposed on a rotation center of the bearing body and rotates with the bearing body.

5. The floating image-type control device according to claim 1, wherein the bearing body comprises:
- a plate connected to the rotation shaft; and
- a side panel connected to the plate, wherein the side panel is substantially perpendicular to the plate, and the image capturing unit is disposed on the side panel.

6. The floating image-type control device according to claim 5, wherein the side panel is located on a rotation center or a side of the plate.

7. The floating image-type control device according to claim 1, wherein the bearing body is an arced structure.

8. The floating image-type control device according to claim 1, wherein the bearing body is a columnar structure, and an extension direction of the bearing body is identical to an extension direction of the rotation shaft.

9. An interactive display system, comprising:
a rotation component, comprising:
- a fixing portion;
- a bearing body; and
- a rotation shaft connected to the bearing body, wherein the rotation shaft rotates relative to the fixing portion to drive the bearing body to rotate;

a control component, comprising:
- an image capturing unit disposed on the bearing body, wherein the image capturing unit rotates with the bearing body and continuously captures a plurality of images;
- a zero-point calibration unit used to send a zero-point signal when the bearing body rotates to a predetermined angle; and
- an image analysis unit used to obtain an operation signal corresponding to a gesture of a user based on the images and the zero-point signal;

a display component connected to the bearing body, wherein the display component rotates with the bearing body.

10. The interactive display system according to claim 9, wherein the zero-point calibration unit comprises:
- a signal emitter disposed on the fixing portion and used to emit a sensing signal; and
- a signal receiver disposed on the fixing portion, wherein when the bearing body rotates to the predetermined angle, the signal receiver receives the sensing signal reflected from the bearing body and further outputs the zero-point signal based on the received sensing signal.

11. The interactive display system according to claim 9, wherein the zero-point calibration unit comprises:
- a signal emitter disposed on the bearing body and used to emit a sensing signal; and
- a signal receiver disposed on the fixing portion, wherein when the bearing body rotates to the predetermined angle, the signal receiver receives the sensing signal and further outputs the zero-point signal based on the received sensing signal.

12. The interactive display system according to claim 9, wherein the image capturing unit is disposed on a rotation center of the bearing body and rotates with the bearing body.

13. The interactive display system according to claim 9, wherein the bearing body comprises:
- a plate connected to the rotation shaft; and
- a side panel connected to the plate, wherein the side panel is substantially perpendicular to the plate, and the image capturing unit is disposed on the side panel.

14. The interactive display system according to claim 13, wherein the side panel is located on a rotation center or a side of the plate.

15. The interactive display system according to claim 9, wherein the bearing body is an arced structure.

16. The interactive display system according to claim 9, wherein the bearing body is a columnar structure, and an extension direction of the bearing body is identical to an extension direction of the rotation shaft.

* * * * *